US008077731B2

(12) United States Patent
Foskett et al.

(10) Patent No.: US 8,077,731 B2
(45) Date of Patent: Dec. 13, 2011

(54) METHOD AND SYSTEM FOR PACKET-BASED TANDEM FREE OPERATION

(75) Inventors: Brian Henry Foskett, Whitley Bay (GB); Charles Marvin Berteau, Plano, TX (US)

(73) Assignee: Alcatel Lucent, Paris (FR)

( * ) Notice: Subject to any disclaimer, the term of this patent is extended or adjusted under 35 U.S.C. 154(b) by 901 days.

(21) Appl. No.: 10/596,264

(22) PCT Filed: Dec. 9, 2004

(86) PCT No.: PCT/US2004/041218
§ 371 (c)(1),
(2), (4) Date: May 25, 2007

(87) PCT Pub. No.: WO2005/057809
PCT Pub. Date: Jun. 23, 2005

(65) Prior Publication Data
US 2007/0230467 A1    Oct. 4, 2007

(51) Int. Cl.
*H04W 8/22* (2009.01)
*H04W 24/02* (2009.01)
*H04W 28/18* (2009.01)
*H04W 40/04* (2009.01)
*H04L 12/26* (2006.01)
*H04L 12/66* (2006.01)

(52) U.S. Cl. ........ 370/401; 370/352; 370/349; 455/450; 455/511

(58) Field of Classification Search .......... 370/241, 370/252, 345, 349, 352, 437, 401, 465–467, 370/477, 498, 329, 341, 348, 458; 455/450, 455/509, 511, 515, 552.1
See application file for complete search history.

(56) References Cited

U.S. PATENT DOCUMENTS

| | | | |
|---|---|---|---|
| 6,108,560 A | 8/2000 | Navaro et al. | |
| 6,256,612 B1 * | 7/2001 | Vo et al. | 704/500 |
| 6,295,302 B1 * | 9/2001 | Hellwig et al. | 370/522 |
| 6,556,844 B1 | 4/2003 | Mayer | 455/560 |
| 6,611,694 B1 * | 8/2003 | Oltedal et al. | 455/560 |
| 6,791,976 B2 * | 9/2004 | Huh et al. | 370/356 |
| 7,142,881 B2 * | 11/2006 | Sekino et al. | 455/550.1 |
| 7,227,873 B2 * | 6/2007 | Lehtimaki | 370/467 |
| 7,257,114 B1 * | 8/2007 | Koistinen | 370/356 |
| 7,313,115 B2 * | 12/2007 | Chu | 370/335 |
| 7,626,976 B2 * | 12/2009 | Koistinen | 370/352 |
| 7,639,601 B2 * | 12/2009 | Rabipour et al. | 370/216 |
| 7,876,745 B1 * | 1/2011 | Stewart et al. | 370/356 |
| 2001/0024960 A1 * | 9/2001 | Mauger | 455/552 |
| 2003/0185160 A1 | 10/2003 | Tegethoff | |
| 2004/0004957 A1 * | 1/2004 | Rabipour et al. | 370/352 |

(Continued)

OTHER PUBLICATIONS

3GPP2 S.R0014, Version 1.0, Tandem Free Operation, Version Date: Dec. 13, 1999.*

*Primary Examiner* — Chi Pham
*Assistant Examiner* — Ahmed Elallam
(74) *Attorney, Agent, or Firm* — RG & Associates LLC

(57) ABSTRACT

A method and system are provided for enabling packet-based tandem free operation C(FO). In one example, the method includes monitoring packets sent between network elements to identify a TFO request message and a TFO acknowledgement message. A substitute TFO acknowledgement message is sent from an intermediate network element if no TFO acknowledgement message is identified, and both TFO and non-TFO call legs may be established.

22 Claims, 5 Drawing Sheets

U.S. PATENT DOCUMENTS

2004/0131051 A1* 7/2004 Rabipour et al. ............. 370/352
2005/0018769 A1* 1/2005 Hellwig et al. .......... 375/240.12
2005/0232232 A1* 10/2005 Farber et al. .................. 370/352
2010/0039949 A1* 2/2010 Rabipour et al. ............. 370/252

* cited by examiner

METHOD AND SYSTEM FOR PACKET-BASED TANDEM FREE OPERATION

BACKGROUND

Telecommunication systems include components that are able to perform various operations on voice and/or data communications carried within such systems. For example, a network based on the Global System for Mobile Communications (GSM) standard may utilize a network element such as a transcoder rate adaption unit (TRAU) to handle the use of different codecs and rates. A TRAU may handle transcoding to convert information between two coding schemes, and may provide rate adaptation to handle the use of eight, sixteen, or thirty-two kbps rather than a higher rate such as sixty-four kbps so that networks or network elements using different codecs and rates can communicate.

To enable control over the configuration of TRAUs for mobile to mobile traffic, Tandem Free Operation (TFO) functionality has been developed. When TFO is deployed, call setup is performed as normal, including the allocation across the network(s) of a 64 kbps channel and insertion of the TRAU in the access and terminating networks. As specified by TFO, the TRAUs will attempt to communicate with one another utilizing in-band signaling over the 64 kbps bearer channel. If communication is successful and the mobile stations support compatible codecs, the transcoding in the access network is disabled, allowing compressed speech to be transported across the mobile network. However, current TFO implementations have limitations that inhibit their usefulness.

Accordingly, an improved method and system for packet-based TFO are needed.

WRITTEN DESCRIPTION

Figure 1:
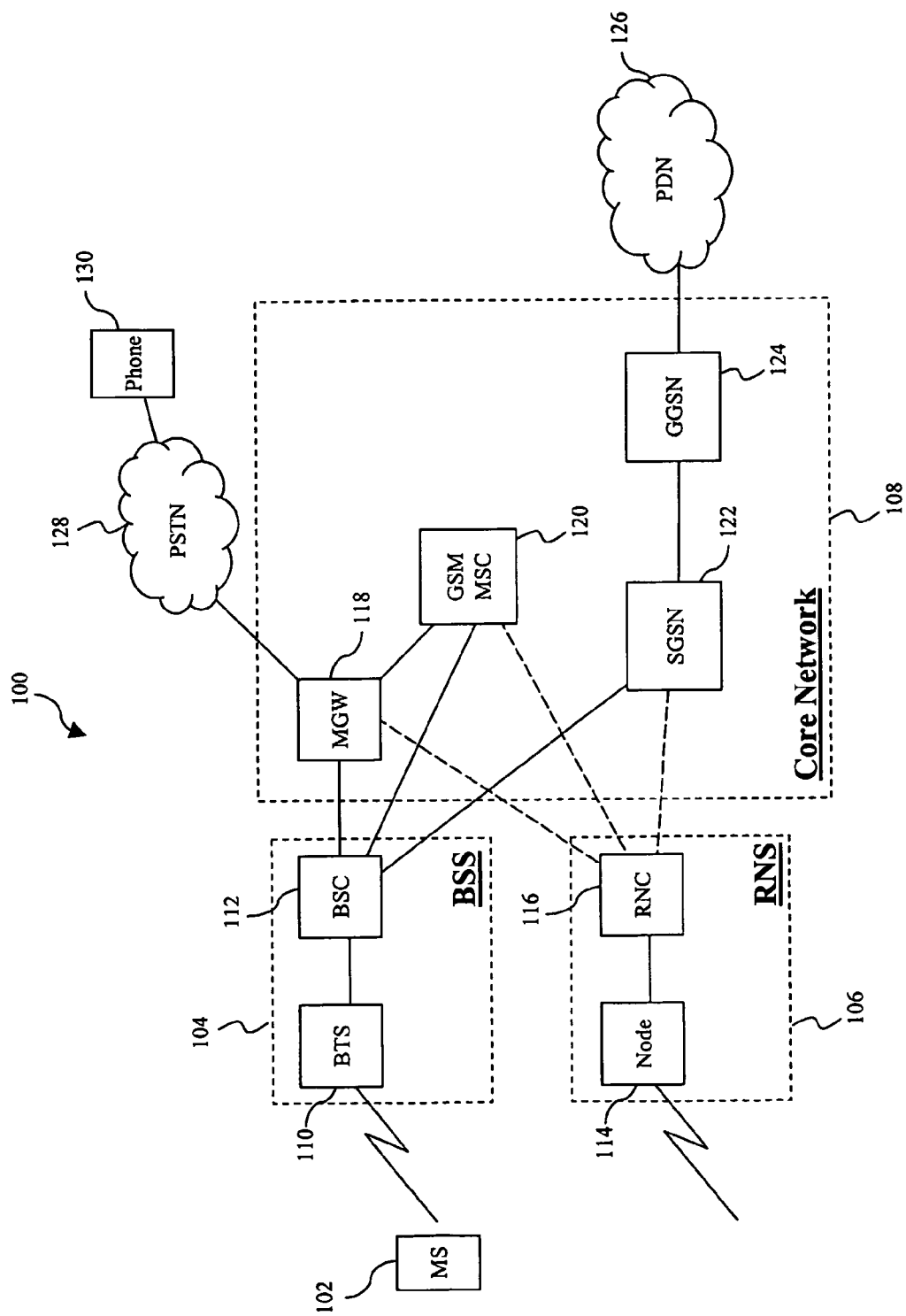
FIG. 1 is a diagram of one embodiment of a network within which the present invention may be implemented.

The present disclosure is directed to a method and system for providing packet-based tandem free operation (TFO) in non-TFO capable networks.

It is understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a network 100 may provide wireless services to a mobile device 102 (also known as a "mobile station" (MS)). The network 100 includes a base station subsystem (BSS) 104, a radio network subsystem (RNS) 106, and a core network (CN) 108, all of which are based on GSM technology. The BSS 104 includes a base transceiver station (BTS) 110 coupled to a base station controller (BSC) 112 to establish and maintain a communication session with the mobile device 102. The RNS 106 includes a node 114 coupled to a radio network controller (RNC) 116. The CN 108 includes a media gateway (MGW) 118, a mobile switching center (MSC) 120, a Serving General Packet Radio Service (GPRS) Support Node (collectively "SGSN") 122, and a Gateway GPRS Support Node (GGSN) 124.

In the present example, both the BSC 112 and RNC 116 are coupled to the MGW 118, the MSC 120, and the SGSN 122. The MGW 118 is also coupled to the MSC 120 and to a PSTN 128, which enables the mobile device 102 to communicate with another device that is not part of the network 100, such as a wireline telephone 130. The SGSN 122 is in communication with the GGSN 124, both of which are coupled to a packet data network (PDN) 126. It is understood that many other network elements may reside in the BSS 104, RNS 106, and/or CN 108. In addition, many other networks and network elements may be coupled to the network 100 in addition to the PDN 126 and PSTN 128. While the network 100 is an example of a network compatible with Revision 4 (R4) of the 3GPP specifications, some or all of the other networks may not be R4 networks, but may instead be based on standards including previous GSM revisions, code division multiple access (CDMA) and/or Universal Mobile Telecommunications Service (UMTS). Various devices may also be serviced by the network 100, includes mobile phones, computers, personal digital assistants, and any other device that is configured to communicate with a wireless or wireline link.

It is noted that a variety of protocols may be utilized to enable communications to occur through the various components of the network 100. For example, some communications may use Signaling System 7 Integrated Services Digital Network (ISDN) User Part (known collectively as "SS7 ISUP") or Internet Protocol (IP), while others may utilize GPRS Tunneling Protocol U (GTP-U) for user data and GTP-C for signaling.

The system 100 may include network elements that are able to perform various operations on voice and/or data communication rates carried within such systems. For example, the system 100 may utilize a network element such as a transcoder rate adaption unit (TRAU) (not shown) to handle the use of different codecs and rates. A TRAU may handle transcoding to convert information between two coding schemes, and may provide rate adaptation to handle the use of eight, sixteen, or thirty-two kbps rather than a higher rate such as sixty-four kbps so that networks or network elements using different rates can communicate. In the present example, although the TRAU may functionally belong the BTS 110, it may be located at the BTS 110, the BSC 112, or (immediately in front of) the MSC 120.

Current TRAU implementations have some disadvantages. For example, a TRAU generally has a fixed position within a GSM network, and may use an interface between itself and the BTS 110 that is essentially proprietary. This prevents flexible positioning of the TRAU that might otherwise offer bandwidth savings or voice quality improvements.

A feature know as Tandem Free Operation (TFO) feature may be used within the network 100 to enable some control over the configuration of the GSM TRAU for mobile to mobile traffic. When TFO is deployed, call setup is performed as normal, including the allocation across the network(s) of a 64 kbps channel and insertion of the TRAU in the access and terminating networks. As specified by TFO, the TRAUs will attempt to communicate with one another utilizing in-band signaling over the 64 kbps bearer channel. If communication is successful and the mobile stations support compatible codecs, the transcoding in the access network is disabled, allowing compressed speech to be transported across the mobile network.

The TFO feature primarily delivers voice quality improvements on mobile-to-mobile calls. Although it functions across both time division multiplexed (TDM) and packet networks and can extend across network boundaries (as all signaling is carried in-band), TFO has fundamental restrictions that reduce its desirability. Examples of such restrictions include the fact that all in-path equipment (IPE) must be TFO friendly (i.e., in-band signaling must not be interrupted before or after invocation of TFO), TFO only provides voice quality improvements for mobile-to-mobile calls, and bearer path bandwidth is constrained at 64 kbps due to the inband signaling mechanism.

Suggested improvements to TFO, such as enhanced TFO (eTFO), focus on extending TFO to provide improved support for packet networks with the goal of delivering significant transport savings. While TFO is designed to work over a packet infrastructure, it does not optimize transmission because, once TFO is activated, it still requires the G.711 stream. In contrast, eTFO initiates a specific control channel (within the user plane) once activated, enabling the voice bearer stream to be reduced below 64 kbps without having to be concerned about the impact on subsequent inband signaling.

Figure 2:
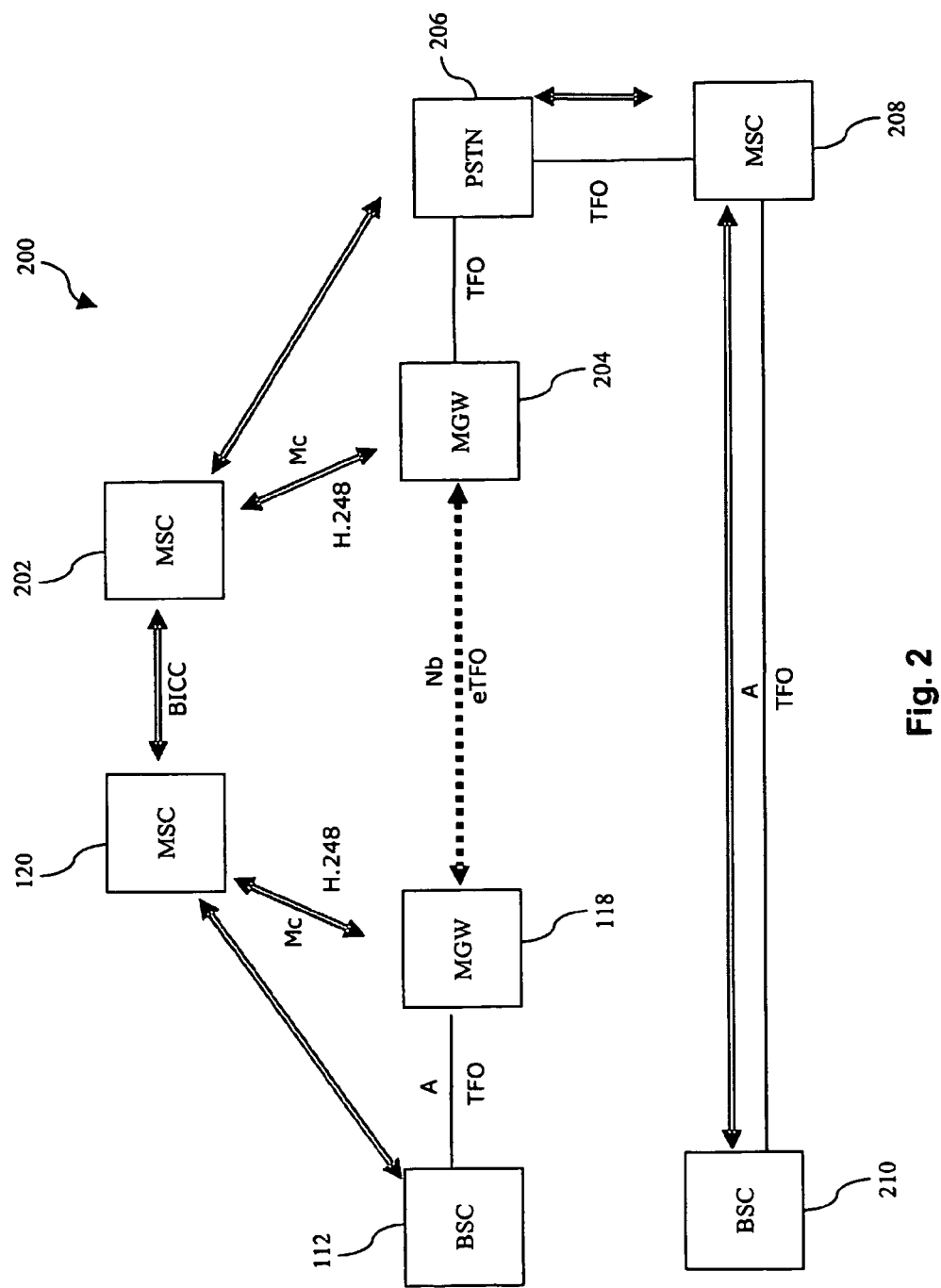
FIG. 2 is a diagram of one embodiment of a system illustrating a TFO/eTFO end-to-end call.

Referring to FIG. 2, one embodiment of a system 200 illustrates various network elements that may be used to provide a call with TFO/eTFO functionality between an R4 architecture and a non-R4 architecture. The system 200 includes the BSC 112, MGW 118, and MSC 120 of FIG. 1, and also includes a MSC 202, a MGW 204, a PSTN 206, a MSC 208, and a BSC 210. As is known in the art, the BSCs 112 and 210 communicate with their respective MSCs as defined by the A interface, each MGW 118, 204 communicates with its respective MSC as defined by the Mc interface using a protocol such as H.248 and with the other MGW as defined by the Nb interface, and the MSCs 120 and 202 communicate using a protocol such as the Bearer Independent Call Control (BICC) protocol.

Following call setup, TFO is activated end-to-end via the standardized in-band signaling messages transported within the G.711 bit stream. This delivers a transport medium which supports mobile-to-mobile voice without any intermediate TRAUs (as any TRAUs are physically present in the communication path but have their transcoding functions fully or partially disabled). In this pure TFO-mode, no transport savings are attainable in either the TDM or packet portions of the voice path.

In an eTFO capable network, however, the Nb interface between the MGWs 118 and 204 supports bit-rates associated with the compressed speech (e.g., enhanced full rate (EFR) or half-rate (HR)), rather than the full 64 kbps required for TFO signaling. This is possible as eTFO initiates a separate control channel within the user plane that facilitates the continued use of in-band signaling. It is noted that the MGWs 118, 204 are not directly involved in the setting up of the TFO channel, but are used in eTFO scenarios where they are required to perform the framing protocol interworking and the initiation of the separate control channel.

Although an improvement over pure TFO, eTFO suffers from the same fundamental restriction as TFO as it only provides benefits for a mobile to mobile call. No voice quality or transport savings improvements are attainable for mixed access type scenarios (e.g., mobile to wireline), which forms a large portion of network traffic.

Figure 3:
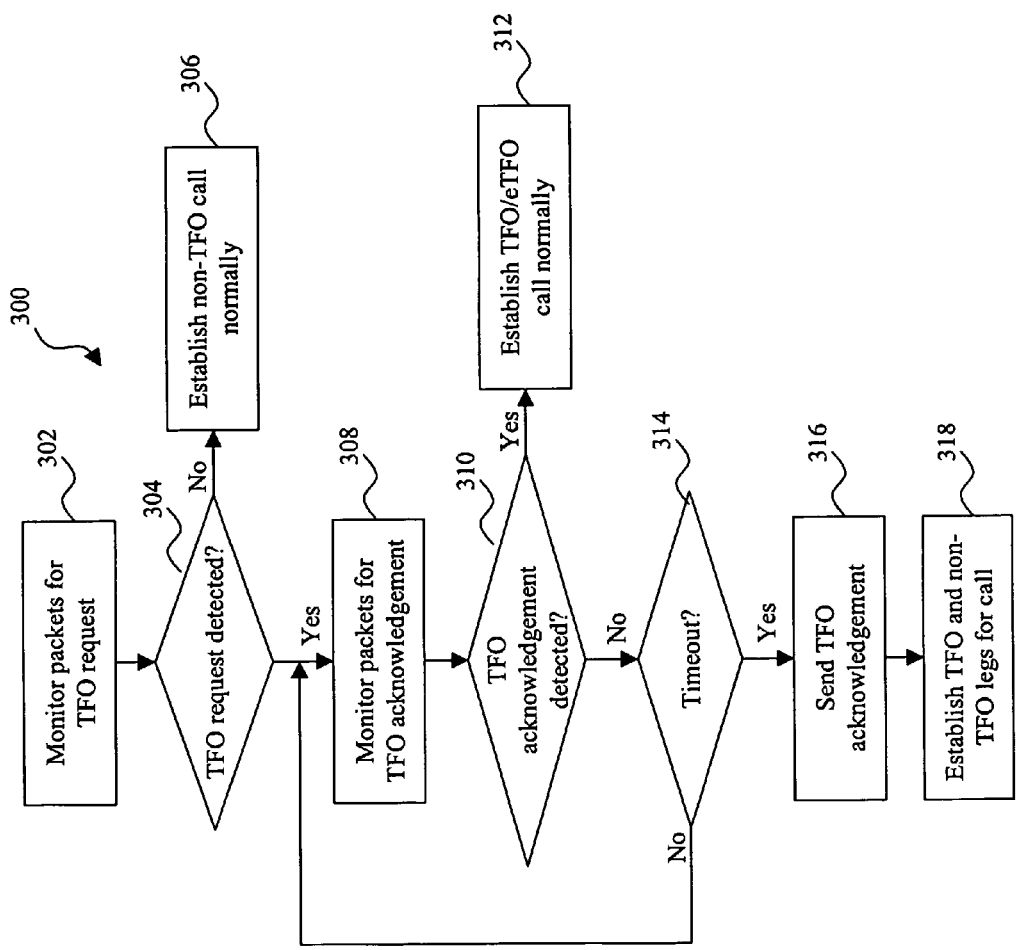
FIG. 3 is a flow chart of one embodiment of a method for determining the need for establishing TFO and non-TFO call legs and establishing a call accordingly.

Referring to FIG. 3, a method 300 provides one embodiment of a process for extending eTFO and other TFO derived packet network technologies to cross-network or inter-network traffic that terminates at any access type. As will be described later in a more specific example, the method 300 may be implemented within one or more network entities, such as in a MGW.

In step 302, a network entity (e.g., the MGW 204), monitors packets from another network entity for a TFO request. If a request is not detected as determined in step 304, the call is set up normally (e.g., without the use of TFO) in step 306. If a TFO request is detected in step 304, then returning packets are monitored for a TFO acknowledgement in step 308. If a TFO acknowledgement is detected (as determined in step 310), the method 100 continues to step 312, where a normal TFO/eTFO call is established. If no TFO acknowledgement is detected in step 310, a determination is made in step 314 as to whether a timeout period has elapsed. If it has not, the method returns to step 310 and continues to monitor the packets for the TFO acknowledgement. If the timeout period has elapsed, the method continues to step 316, where a substitute TFO acknowledgement message is sent. The sending network entity then acts as the terminating TRAU for purposes of the call, and the call is set up with both TFO/eTFO and non-TFO legs. It is understood that various network entities may be involved in the monitoring and sending of messages, and that the monitoring network entity may or may not be the network entity acting as the terminating TRAU.

Figure 4:
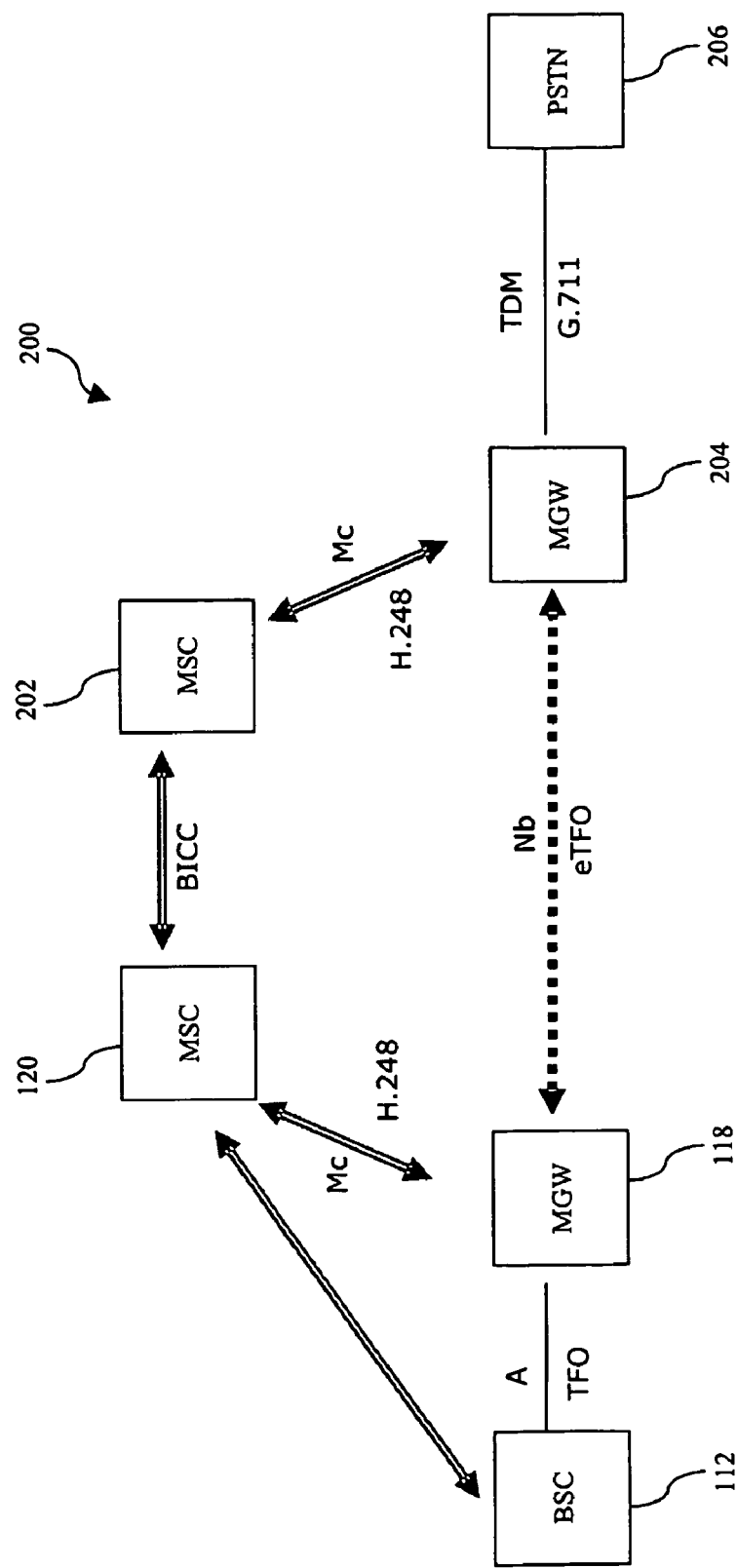
FIG. 4 is a diagram of one embodiment of a system within which TFO and non-TFO call legs have been established according to the method of FIG. 3.
Figure 5:
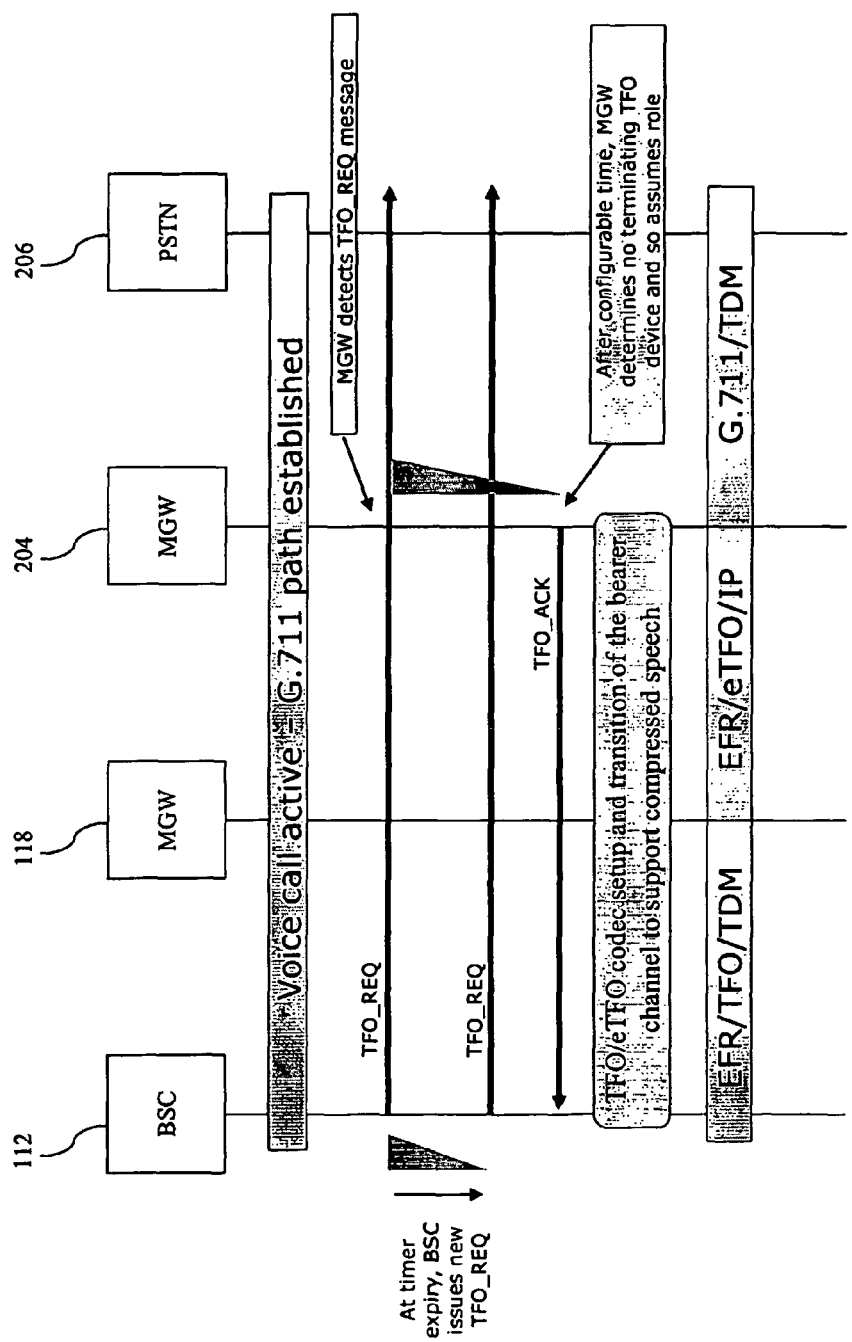
FIG. 5 is sequence diagram of a specific example of the method of FIG. 3 within the system of FIG. 4.

Referring now to FIG. 4 (which includes network elements from the system 200 of FIG. 2) and FIG. 5, a more specific example of the method 300 of FIG. 3 is provided. In the present example, functionality is added to the MGWs 118 and 204 that enables leg-by-leg instantiation of the TFO protocol, rather than requiring an end-to-end TFO connection. In particular (FIG. 5), MGW 204 includes functionality for determining if the call path to the right of it (e.g., between itself and the PSTN 206) supports TFO. If it does, a call using TFO/eTFO is established as previously described. If it does not, then MGW 204 will act as the TFO terminating TRAU and convert the compressed speech to G.711.

As illustrated in FIG. 5, TFO signaling procedures may be utilized as defined by the applicable 3GPP standards (e.g., TR 28.062). In the present example, the MGW 204 does not initiate TFO independently, but monitors the G.711 frames from the MGW 118 for TFO requests from the TRAU associated with the initiating endpoint. These messages (TFO_REQ) are passed along in the speech frames unaltered. If the terminating call-end also supports TFO, it will return the TFO_ACK message (not shown). This will initiate the TFO/eTFO procedures (e.g., this TFO_ACK message will be identified by the MGW 204 in the backward speech frames, and the MGW 204 will recognize that this is a end-to-end mobile call).

However, if after a configurable period of time, the MGW 204 fails to identify a backward TFO_ACK message, the MGW 204 assumes that the call is terminating to a non-mobile access device (e.g., that there is no TFO capable terminating TRAU). In the present example, this process may only be invoked on MGWs with a TDM facility path on the remote side from the TFO active TRAU. In this scenario, the extended TFO/eTFO procedures would be activated, which involve transitioning the MGW 204 to a TFO Interworking Gateway. The MGW 204 functions as the terminating TRAU and sends a message back to the originating TRAU with a TFO_ACK (or a TFO_REQ) to initiate the transport of compressed speech. Accordingly, the call leg between the BSC 112 and the MGW 118 may be established using EFR/TFO/TDM, the call leg between the MGWs 118 and 204 may be established using EFR/eTFO/IP, and the call leg between the MGW 204 and PSTN 206 may be established using G.711/TDM. This enables TFO/eTFO to be used even though there is not a "true" terminating TRAU, and allows the benefits of TFO/eTFO to be used with non-mobile devices, such as the wireline telephone 130 of FIG. 1.

It is understood that the MGW 118 may include similar functionality. Accordingly, the MGW 118 may monitor messages to determine whether the next network entity (e.g., the MGW 204) is able to support TFO/eTFO. In the present example, as the MGW 118 will see both the TFO_REQ and the TFO_ACK, it does not change its behavior.

The networks, network entities, and protocols presented herein are used as a representative application to describe the present disclosure. However, the present disclosure can apply to any type of network or network element that may implement TFO. In addition, the functionality described in the various embodiments may be implemented in hardware and/or software. For example, software instructions for implementing the method of FIG. 3 may be stored on a single network element (e.g., a media gateway). Alternatively, the described functionality may be divided as desired among multiple network elements, with each element having some or all of the described functionality. It is understood that various steps of the methods described herein may be rearranged, combined, or further divided, and some implementations may require the use of alternative steps. Accordingly, while the disclosure has been particularly shown and described with reference to the preferred embodiment thereof, it will be understood by those skilled in the art that various changes in form and detail may be made therein without departing from the spirit and scope of the disclosure, as set forth in the following claims.

What is claimed is:

1. A method for providing packet-based tandem free operation (TFO) in a telecommunications system having at least a first network element, a third network element, and a second network element positioned between the first and third network elements, the method comprising:
   monitoring packets sent from the first network element to the third network element to identify a TFO request message;
   monitoring packets sent from the third network element to the first network element to identify a TFO acknowledgement message from the third network element in response to the TFO request message;
   sending a substitute TFO acknowledgement message from the second network element to the first network element if no TFO acknowledgement message is identified from the third network element; and
   establishing a TFO call leg between the first and second network elements and establishing a non-TFO call leg between the second and third network elements after sending the substitute TFO acknowledgement message from the second network element.

2. The method of claim 1 further comprising:
   determining whether a timeout period has elapsed without identifying the TFO acknowledgement message from the third network element; and
   sending the substitute TFO acknowledgement message from the second network element only if the timeout period has elapsed.

3. The method of claim 2 further comprising starting the timeout period after identifying the TFO request message.

4. The method of claim 3 further comprising setting the timeout period to a predefined period of time prior to starting the timeout period.

5. The method of claim 3 wherein the second network entity is a media gateway.

6. The method of claim 1 wherein the TFO call leg includes the use of enhanced TFO (eTFO).

7. The method of claim 1 further comprising establishing a non-TFO call if no TFO request message is identified.

8. The method of claim 1 further comprising establishing an end-to-end TFO call if a TFO acknowledgement message is identified from the third network element.

9. A method for providing packet-based tandem free operation (TFO) in a telecommunications system having at least a first media gateway positioned between a first device configured for TFO capability and a second device not configured for TFO capability, the method comprising:
   monitoring packets sent from the first device to the second device to identify a TFO request, wherein the monitoring is performed by the media gateway;
   monitoring packets sent from the second device to the first device to identify a TFO acknowledgement sent in response to the TFO request, wherein the monitoring is performed by the media gateway;
   sending a substitute TFO acknowledgement from the media gateway to the first device if no TFO acknowledgement is identified from the second device; and
   establishing a first leg between the first device and the media gateway using TFO and establishing a second leg between the media gateway and second device without using TFO after sending a TFO acknowledgement from the media gateway.

10. The method of claim 9 further comprising: determining whether a timeout period has elapsed without identifying the TFO acknowledgement from the second device; and sending the TFO acknowledgement from the media gateway only if the timeout period has elapsed.

11. The method of claim 10 further comprising starting the timeout period after identifying the TFO request.

12. The method of claim 11 further comprising setting the timeout period to a predefined period of time prior to starting the timeout period.

13. The method of claim 9 further comprising establishing a non-TFO call if no TFO request is identified.

14. The method of claim 9 further comprising establishing an end-to-end TFO call if the substitute TFO acknowledgement is identified from the second device.

15. A system for providing packet-based tandem free operation (TFO), the system comprising:
   a first media gateway coupled to a Base Station Controller (BSC) having TFO capabilities and a network entity not capable of supporting TFO;
   wherein the first media gateway includes:
   monitoring packets sent from the BSC to the network entity to identify a TFO request;
   monitoring packets sent from the network entity to the BSC to identify a TFO acknowledgement sent in response to the TFO request;
   sending a substitute TFO acknowledgement from the first media gateway to the BSC if no TFO acknowledgement is identified from the network entity; and
   establishing a first leg between the BSC and the first media gateway using TFO and establishing a second leg between the first media gateway and the network entity without using TFO.

16. The system of claim 15 further comprising at least a first mobile switching center coupled to the first media gateway.

17. The system of claim 15 further comprising: determining whether a timeout period has elapsed without identifying the TFO acknowledgement from the network entity; and sending the TFO acknowledgement from the first media gateway only if the timeout period has elapsed.

18. The system of claim 15 further comprising establishing a non-TFO call if no TFO request is identified.

19. The system of claim 15 further comprising establishing an end-to-end TFO call if the substitute TFO acknowledgement is identified from the network entity.

20. The system of claim 15 further comprising:
a second media gateway positioned between the first media gateway and the network entity;
wherein second media gateway includes:
monitoring packets sent from the first media gateway to the network entity to identify a TFO request;
monitoring packets sent from the network entity to the first media gateway to identify a TFO acknowledgement;
sending a substitute TFO acknowledgement from the second media gateway to the first media gateway if no TFO acknowledgement is identified from the network entity; and
establishing a third leg between the first and second media gateways using TFO and establishing a fourth leg between the second media gateway and the network entity without using TFO after sending a TFO acknowledgement from the second media gateway.

21. A system for providing packet-based tandem free operation (TFO), the system comprising:
a first network element configured to include TFO capabilities;
a second network element not configured to include TFO capabilities;
at least a third network element positioned between the first and second network elements and configured to channel communications between the first and second network elements;
means for monitoring packets sent from the first network element to the second network element during call setup to identify a TFO request message;
means for establishing a non-TFO call if no TFO request message is identified;
means for monitoring packets sent from the second network element to the first network element to identify a TFO acknowledgement message;
means for establishing a TFO call between the first and second network entities if a TFO acknowledgement message is identified from the second network element;
means for sending a substitute TFO acknowledgement message from the third network element to the first network element if no TFO acknowledgement message is identified from the second network element; and
means for establishing a TFO call leg between the first and third network elements and establishing a non-TFO call leg between the second and third network elements after sending a TFO acknowledgement message from the third network element.

22. The method of claim 21 further comprising: determining whether a timeout period has elapsed without identifying the TFO acknowledgement message from the second network element; and sending the TFO acknowledgement message from the third network element only if the timeout period has elapsed.

* * * * *